United States Patent [19]

Schafer et al.

[11] 3,937,666

[45] Feb. 10, 1976

[54] USE OF THIOINDIGO FOR OBTAINING FLUORESCENT DYEINGS IN POLYVINYL CHLORIDE

[75] Inventors: Hugo Schafer, Kelkheim, Taunus; Erwin Janousch, Camberg, both of Germany

[73] Assignee: Hoechst Aktiengesellschaft, Frankfurt am Main, Germany

[22] Filed: July 25, 1973

[21] Appl. No.: 382,380

Related U.S. Application Data

[63] Continuation-in-part of Ser. No. 181,193, Sept. 16, 1973, abandoned.

[30] Foreign Application Priority Data

Sept. 18, 1970 Germany............................ 2046111

[52] U.S. Cl......................... 252/301.2 R; 8/4; 8/38; 260/92.8 A

[51] Int. Cl.².................... C08F 45/66; C09K 11/00

[58] Field of Search..................... 252/301.2, 301.3; 260/92.8 A, 42.21; 8/4, 38

[56] References Cited

UNITED STATES PATENTS

| | | | |
|---|---|---|---|
| 2,498,593 | 2/1950 | Switzer | 252/301.2 |
| 2,983,686 | 5/1961 | Konig | 252/301.2 |

FOREIGN PATENTS OR APPLICATIONS

1,233,842   6/1971   United Kingdom

*Primary Examiner*—Christopher A. Henderson
*Attorney, Agent, or Firm*—Curtis, Morris & Safford

[57] ABSTRACT

A process for the fluorescent dyeing of polyvinyl chloride which consists in incorporating thioindigo into a composition consisting essentially of polyvinyl chloride, and the fluorescent dyed polyvinyl chloride composition thus produced.

2 Claims, No Drawings

USE OF THIOINDIGO FOR OBTAINING FLUORESCENT DYEINGS IN POLYVINYL CHLORIDE

This is a continuation-in-part of co-pending application Serial No. 181,193 filed Sept. 16, 1973, now abandoned.

It is already known that pigments of the thioindigo type which are frequently used above all in the lacquer industry, such as for example the 4,4',7,7'-tetrachlorothioindigo and the 5,5'-dichloro-7,7'-dimethylthioindigo, yield red violet fluorescent dyeings due to their solubility in polystyrene. Thus, blue red fluorescent injection-molded articles are obtained, if polystyrene containing 0.05% of 5,5'-dichloro-7,7'-dimethylthioindigo is molded at temperatures above 200°C (or containing 0.05% of 4,4',7,7'-tetrachloro-thioindigo is molded at temperatures above 270°C). In polyvinyl chloride, however, the mentioned thioindigo pigments do not yield any considerably fluorescent dyeings, since these pigments are not sufficiently soluble in the mentioned media at the usual working temperatures.

Now a fluorescent dyed polyvinyl chloride homopolymer composition consisting essentially of polyvinyl chloride homopolymer and an amount of unsubstituted thioindigo sufficient to effect fluorescence has been found. The dyeing of polyvinyl chloride with thioindigo is effected by all methods known for the dyeing of polyvinyl chloride at the usual working temperatures (about 160° – 200°C). These methods include heating the plastic material and working the dyestuff into the plastic material by the influence of shearing forces for example on a double roller device which runs at different speeds, in a kneader, in an extruder or in an injection moulding device. It has to he understood that the compositions according to this invention can take every possible shape and that this invention is not limited to any special shape described herein.

The concentration of thioindigo may vary within wide limits and depends on the type of the polyvinyl chloride used, on the processing conditions, the content of other additives such as for example plasticizers, and on the thickness of the objects to be dyed. In most of the cases, dyestuff concentrations between 0.01 and 0.5% are suitable.

An object made of polyvinyl chloride dyed in this way shows a brilliant blue red fluorescence. Thus, a rigid polyvinyl chloride plate, which has been dyed with 0.1% of thioindigo and 1% of titanium dioxide, shows a re-emission of 130% between 630 nm and 640 nm, the re-emission of a white standard (BaSO$_4$) having been fixed to 100%. In contradistinction thereto, the values of re-emission of 4,4',7,7'-tetrachloro-thioindigo and 5,5'-dichloro-7,7'-dimethylthioindigo range below 100% under the same conditions, since no fluorescence is perceptible.

The objects which have been dyed with thioindigo with a fluorescent effect may be used in many fields, for example for security or decoration purposes.

In contradistinction to the dyeings which are obtained with rhodamines or daylight pigments, the dyeings of polyvinyl chloride using thioindigo are distinguished by a much better fastness to light.

The following Examples illustrate the invention. Parts and percentages are by weight unless stated otherwise.

EXAMPLE 1

0.1 Part of thioindigo and 1 part of titanium dioxide (rutile, stabilized) were incorporated for 8 minutes on a double roller mixer at a roller temperature of 160°C and a friction of 1:1,2 into 100 parts of a rigid PVC mixture consisting of 100 parts of PVC mass polymerization product, k value of 70
3 parts of barium-cadmium stearate
1 part of tertiary organic phosphite
1 part of octyl ethoxy stearate and
0.3 part of oxystearic acid The rigid colored polyvinylchloride sheet was removed from the roller and pressed for 5 minutes at 160°C on a platen-press. The so obtained test plate was distinguished by a very brilliant bluish red fluorescent shade.

EXAMPLE 2

0.05 Part of thioindigo were incorporated for 8 minutes on a double roller mixer at a roller temperature of 160°C and a friction of 1:1.2 into 100 parts of a plasticized PVC mixture consisting of 67 parts of PVC mass polymerization product, k-value 70
33 parts of dioctyl phthalate and
2 parts of an organic sulfur-tin-stabilizer The plasticized colored polyvinylchloride sheet was removed from the roller and pressed for 5 minutes at 160°C on a platenpress. The sheet thus obtained showed by daylight an intense bluish red fluorescence. Likewise shaped articles can be obtained by incorporating the thioindigo into the PVC on a injection molding device.

We claim:

1. A fluorescent dyed polyvinyl chloride homopolymer composition consisting essentially of solid polyvinyl chloride homopolymer and an amount of unsubstituted thioindigo sufficient to effect fluorescence.

2. A composition according to claim 1 wherein said amount of unsubstituted thioindigo is from 0.01 to 0.5% by weight of said composition.

* * * * *